United States Patent [19]
Lanzo et al.

[11] 3,721,646
[45] March 20, 1973

[54] PROCESS FOR THE PREPARATION OF SELF-EXTINGUISHING POLYMERS

[75] Inventors: Rosario Lanzo, Mantova; Nicolino Rainaldi, Mestre, both of Italy

[73] Assignee: Montecatini Edison S.p.A., Milan, Italy

[22] Filed: April 8, 1970

[21] Appl. No.: 26,794

[30] Foreign Application Priority Data

April 10, 1969 Italy..................15341 A/69

[52] U.S. Cl............260/45.7 R, 260/880 R, 260/892
[51] Int. Cl..............................C09k 3/28
[58] Field of Search............260/2.5 FP, 45.7 R, 653

[56] References Cited

UNITED STATES PATENTS

| 3,271,344 | 9/1966 | Lowes, Jr. | 260/29.6 |
|---|---|---|---|
| 2,760,947 | 8/1956 | Werkema et al. | 260/33.8 |
| 2,863,848 | 12/1958 | Robitschek et al. | 260/869 |
| 2,678,953 | 5/1954 | Conly | 260/653 |
| 3,093,599 | 6/1963 | Mueller-Tamm et al. | 260/2.5 |
| 2,757,212 | 7/1956 | Cleaver et al. | 260/653 |

*Primary Examiner*—Donald E. Czaja
*Assistant Examiner*—R. A. White
*Attorney*—Karl F. Ross

[57] ABSTRACT

A process for producing self-extinguishing polymers in which, during the polymerization of a styrene-based monomeric composition, there is added a bromofluorohydrocarbon (alkane) of the general formula:

$$C_nBr_xF_y,$$

wherein $n$ is a integer ranging from 1 to 8, $y$ is greater than $x$ and $x + y = 2n + 2$.

3 Claims, No Drawings

PROCESS FOR THE PREPARATION OF SELF-EXTINGUISHING POLYMERS

FIELD OF THE INVENTION

Our present invention relates to a process for producing nonflammable, noncombustible or self-extinguishing synthetic-resin compositions, and improved self-extinguishing products made by this process; more particularly, the invention relates to the preparation of self-extinguishing styrene-based polymers.

BACKGROUND OF THE INVENTION

One of the most important physical properties of synthetic resins or polymers is the resistance thereof to combustion, this property being significant in the use of the polymers in the home or in industry and wherever it is possible that products made from the polymers may be exposed to fire or flame.

It has been proposed to reduce the combustibility, burning rate and inflammability of polymeric compositions by incorporating therein compounds such as organophosphates and halogen-containing substances having a high heat capacity and the tendency to produce gaseous substances which blanket the combustion site and prevent access of oxygen thereto.

These compounds, generally mixed with the previously polymerized compositions have been found to be inconvenient to use and to adversely affect important physical properties of products made from the polymers.

When chlorine-based compounds are supplied as the additive capable of making the composition self-extinguishing for reducing the combustion rate, it has been found to be necessary to have a chlorine content of 10 to 20 percent by weight and it has been observed further that considerably less bromine (e.g. 2 to 6 percent by weight) may be used when bromine-containing compounds are provided to reduce flammability and combustion rate. Even these quantities of self-extinguishing additives have been associated heretofore with diminution of the physical properties of the compositions.

When the term "self-extinguishing" is used herein, it is intended thereby to describe the property of a material which permits the latter to extinguish any combustion flame which may have been created therein.

Of course, the self-extinguishing properties of the material are related to the flammability thereof, the combustion rate and the rate to which any established combustion is terminated.

OBJECTS OF THE INVENTION

It is, therefore, a principal object of the present invention to provide a method of or process for the production of polymeric compositions having good physical properties and homogeneity as well as a high-extinguishing rate and self-extinguishing characteristics, it being noted that conventional compositions and products containing self-extinguishing additives have heretofore been characterized by a reduction in quality and homogeneity.

It is another object of this invention to provide a method of or a process for producing styrene-based polymers of good self-extinguishing characteristics and low combustion rate.

Another object of the invention is to provide styrene-based polymers and products made therefrom with high-quality homogeneous characteristics and self-extinguishing properties.

SUMMARY OF THE INVENTION

These objects and others which will become apparent hereinafter are attained, in accordance with our present invention, by the polymerization of a styrene-based monomeric component in the presence of a styrene-polymerization catalyst and under styrene-polymerization conditions in the presence, during polymerization, of a self-extinguishing additive in the form of a bromofluorohydrocarbon (bromofluoroalkane) having the general formula

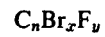

$$C_nBr_xF_y$$

wherein $n$ is an integer ranging from 1 to 8 inclusively, $x$ and $y$ are integers with $y$ being greater than $x$ and $x + y = 2n = 2$. When $n = 1$, $x + y = 4$ and for $2 \leq n \leq 8$, $x + y = 2n + 2$ or 6 to 18. In any case, the ratio $y/x$ is greater than unity.

Best results are obtained with compounds of this general formula wherein $n = 2$, especially $CF_2Br - CF_2Br$.

While applicants are not fully able to explain why these compounds have surprisingly greater effectiveness when incorporated in the polymer during the polymerization step than otherwise and are surprisingly more effective than other bromine-containing compounds no matter how incorporated, it is believed that the effect is due in part to the molecular weight of the styrenic compositions and additives and a contribution to improved surface characteristics and appearance contributed in part by the self-extinguishing additives.

The additives appear somehow to become involved in the polymerization process and to contribute to the polymer in more than self-extinguishing properties and can be included in amounts of 0.1 to 10 and preferably 0.5 to 4 parts by weight per 100 parts by weight of the monomeric component without substantially diminishing the desired physical properties or molecular weight of the styrene-based polymers thus produced.

The styrene-based polymers according to the present invention include polymers consisting in whole or in part of polystyrene or styrene graftpolymerized or copolymerized with other monomers of the vinyl type. Preferably styrene constitutes the major proportion of the monomeric component i.e. is present in an amount of at least 50 percent by weight in the monomeric component.

"Styrene," as this term is used here, includes the unsubstituted compound vinyl-benzene as well as substituted styrenes in which the substituent (e.g. a halogen, alkyl or another vinyl group or an aralkyl) group is placed on the benzene nucleus or in the vinyl group.

The monomeric component may thus contain up to 50 percent vinyl or vinylidene compounds and compounds with similar unsaturation.

The monomeric component may contain as part or all of the styrene: alphamethylstyrene, methylstyrene, ethylstyrene, monochlorostyrene, dichlorostyrene and like alkyl styrenes, halo-styrenes.

As compounds copolymerizable with the styrene component there may be listed acrylonitrile, methacrylonitrile, the alkylesters of acrylic and methacrylic acid such as methylmethacrylate and the like.

The self-extinguishing additives also may be incorporated in styrene-based compounds (polymers and/or copolymers) of the types produced by polymerizing styrene and/or its substituted derivatives along or in admixture with unsaturated compounds of the vinyl and/or vinylidene type, with synthetic or natural rubber. This group of compounds, which may be made self-extinguishing according to the invention, includes high-impact polystyrene and styrene-butadiene-acrylonitrile (ABS) terpolymers. High-impact compositions according to this invention may also be made by mixing or blending styrene-based polymers containing the additive with high-impact polymers which have been polymerized without the presence of the bromofluoroalkanes specified earlier.

EXAMPLE

A master batch is prepared by blending 100 parts by weight of monomeric styrene with 0.09 parts by weight of tertiary-butyl-perbenzoate (catalyst system); the self-extinguishing compound is of the type and in the quantities given in Table I infra.

Polymerization was carried out in glass flasks which were flushed with nitrogen, provided with the master batch and the self-extinguishing compounds, hermetically sealed and placed in a thermostatically controlled bath. The temperature of the bath was maintained for 9 hours at 85° C, for 4 hours at 95° C, for 3 hours at 100°, for 1 hour at 105° C, for 1 hour at 115° C, for 2 hours at 125° C.

At the conclusion of this period, the flasks were emptied and the polymeric mass thoroughly ground. Plates were prepared from the powder of each sample by pressure-molding in a rectangular mold having dimension of 200 × 200 × 6.2 mm. MOlding was done with heating of the mold for a period of 10 minutes at 135° C.

From the plates thus obtained, test specimens of rectangular configuration were milled to a size of 12.7 × 6.35 × 127 mms. The test was performed in accordance with ASTM Standard D 635-56-T with the specimen was held at an inclination of 45° to the horizontal in accordance with this standard. Two notches were marked on the specimen with spacing from one another of 76 mm and a distance from the respective edges of 25.4 mm. One end of the specimen was clamped in accordance with the specified standard and a Bunsen-burner flame brought toward the free end with combustion continuing until the flame reached the first notch. The Bunsen burner was then removed and the specimen allowed to burn without induced combustion until the flame was extinguished. The burned portion was measured starting from the second notch calibrated such that a distance of "0" corresponding to no combustion. The time required for the combustion distance was also determined.

The Table contains the results of the test together with the molecular weight as determined by the Staudinger method of the precipitated polymer, the residual monomer and the solubility of the polymer in methanol are given in the accompanying table. The molecular weight was determined from measurements of specified viscosity at 25° C of a solution of the polymer in toluene (2 grams per liter) in accordance with the relationship $\overline{M} = 2.89 \times 10^5 \mu$ where $\overline{M}$ is the calculated average molecular weight and $\mu$ is the specific viscosity. Residual monomer (styrene) was determined by spectrophotometric analysis.

Tests A through C are given for comparison while test D through G illustrate the use of a self-extinguishing agent according to the present invention. Test A was carried out with no self-extinguishing agent while test B and C show the results obtained when conventional self-extinguishing agents were used as indicated. A comparison of tests B and C with tests D to G demonstrate that self-extinguishing properties are obtainable without substantial molecular weight reduction and it is noted that the characteristics of the polymer with the system of tests D through G are vastly superior to the polymer resulting from tests B and C.

| Test | A | B | C | D | E | F | G |
|---|---|---|---|---|---|---|---|
| Self-extinguishing additive: | | | | | | | |
| Tris-2-3 dibromo-propyl-phosphate, percent by weight of styrene | | 2 | 4 | | | | |
| $CF_2Br-CF_2Br$, percent by weight of styrene | | | | 1 | 1.5 | 2 | 4 |
| Chemical-physical characteristics: | | | | | | | |
| Molecular weight | 71,900 | 57,700 | 59,300 | 66,100 | 66,000 | 59,500 | 57,500 |
| Residual monomeric styrene, percent | 2.5 | 3 | 1.1 | 1.4 | 2 | 2.5 | 1.5 |
| Percentage solubility in methanol | 3.0 | 4.8 | 5.2 | 3.2 | 4.5 | 5.3 | 6 |
| Self-extinguishing characteristics: | | | | | | | |
| Length of burned specimen in mm | 76 | 76 | 0 | 76 | 34 | 1 | 0 |
| Combustion rate in mm./sec | 23 | 19 | 0 | 17 | 17 | 16 | 0 |
| Evaluation | Burns | Burns | (¹) | Burns | (²) | (²) | (¹) |

¹ Does not burn.   ² Self-extinguishing.

We claim:

1. A self-extinguishing polystyrene composition produced by polymerizing styrene in the presence of an effective amount of symmetrical dibromotetrafluoroethane.

2. The composition defined in claim 1 wherein said symmetrical dibromotetrafluoroethane is used in an amount of 0.1 to 10 parts by weight per 100 parts by weight of the styrene.

3. The composition defined in claim 2 wherein said symmetrical dibromotetrafluoroethane is used in an amount of 0.5 to 4 parts by weight per 100 parts by weight of the styrene.

* * * * *